United States Patent [19]

Rinkleib et al.

[11] 3,908,925

[45] Sept. 30, 1975

[54] TAPE CASSETTE OPENER

[75] Inventors: Helfried O. Rinkleib; William J. Rueger, both of Longmont, Colo.

[73] Assignee: International Business Machines Corporation, Armonk, N.Y.

[22] Filed: Apr. 30, 1974

[21] Appl. No.: 465,645

[52] U.S. Cl. .......... 242/68.3; 285/319

[51] Int. Cl.$^2$ .......... B65H 17/02

[58] Field of Search .......... 242/68.3, 197–199; 294/86.32, 99 R, 99 S; 285/319

[56] References Cited

UNITED STATES PATENTS

| | | | |
|---|---|---|---|
| 3,288,514 | 11/1966 | Fry, Jr. | 294/87.2 |
| 3,825,208 | 7/1974 | Johnston et al. | 242/197 |
| 3,837,690 | 9/1974 | Fraser et al. | 285/319 |

*Primary Examiner*—Leonard D. Christian

*Attorney, Agent, or Firm*—Herbert F. Somermeyer

[57] ABSTRACT

A tubular tool simultaneously unlatches a tubular cover from a contained spool of tape and holds the spool for winding and reeling operations. The tool operates on an annular latch securing the tubular cover to the spool core. The tool has an annular cam plus a set of coaxial circularly disposed resilient fingers extending beyond the cam. The cam and fingers are constructed to interact with the annular latch and spool ring inducing unlatching forces.

5 Claims, 3 Drawing Figures

TAPE CASSETTE OPENER

RELATED COMMONLY ASSIGNED PATENT APPLICATION

Proper et al. Ser. No. 445,732, filed Feb. 25, 1974, now U.S. Pat. No. 3,854,605, discloses apparatus with which the present invention may be advantageously employed.

BACKGROUND OF THE INVENTION

It has been desired over the last several years to provide large on-line data bases. To this end, the Burke et al U.S. Pat. Nos. 2,941,738 and 2,941,739 show an automatic tape library employing spooled magnetic tape. While the Burke et al. apparatus may provide extremely high data rates, yet greater data rates are desired. To this end, the length of tape on a given spool is reduced in length while increased in width. With such modification of the tape, tape-containing cartridges are also modified to accommodate the different shape. As a result of these geometric changes, the autoloader apparatus, i.e., the apparatus which transfers the tape-containing cartridge between an accessor or XY carriage and a tape drive or read/write unit as shown in Burke et al, is not suitable.

Some of the above-stated results are achieved by a particular cartridge design shown by Rinkleib et al in commonly assigned copending application Ser. No. 318,954, filed Dec. 27, 1972, and now U.S. Pat. No. 3,825,208. To use the Rinkleib et al. described cartridge in the storage apparatus of the type envisioned, it is desired to have a magnetic disk for facilitating electromagnetic accessing such cartridge. Hence, the disk must always face the travel path when stored in the storage compartment wall. Further, such cartridge should be automatically supplied to a read/write unit for tape document processing. The tape inside the cartridge is threaded past a transducing station in a read/write unit. First, a cartridge cover must be quickly and positively separated from the tape supporting spool. To prevent recording errors, the separation must not generate debris from any rubbing interaction between an unlatching apparatus and the cartridge latch. Such rubbing generated debris contaminates the record medium thereby increasing the probability of read and write errors in data processing operations. Accordingly, the apparatus should handle tape-containing cartridges in a manner which minimizes wear, hence debris generation.

Another factor in high-speed data recorder operation is precise coaxial alignment of a tape spool with its driving and idling apparatus. Such alignment should be done with simple fast-acting apparatus and in a manner that manufacturing tolerances are maximized.

SUMMARY OF THE INVENTION

It is an object of the present invention to provide a combined tape cartridge opening and spool-holding apparatus which tends to minimize debris generation while requiring low energy to separate a cover and an enclosed tape spool. At a work position, a reciprocating idler shaft engages a spool within the tape-containing cartridge and moves it downwardly through a cartridge conveyor into a read/write unit immediately below the conveyor. The tape is automatically unspooled and subjected to suitable transducing operations. Upon completion of such operations, the tape is rewound on the spool; the idler shaft is then reciprocated upwardly, returning the spool into the cover retained in the conveyor. The conveyor is then indexed, moving a new cartridge into the work position while moving the first processed cartridge to an output position.

In accordance with the invention, a cartridge opening and spool-holding tool has an axially and radially inwardly acting annular cam for unlocking a tubular cover from an open core end of a flanged spool. A coaxial circular set of resilient spool-holding fingers has radially outwardly extending detents for engaging a radially inwardly extending rib on the inner core of the spool to axially urge such spool in a direction opposite to the annular cam axially urging, thereby using the finger resiliency to hold the spool free end. The axial coaction is such that the finger resiliency assists in separating the spool from the cover. Further, the axial coaction reduces wear by eliminating a compression and release cycle of the latching fingers from each cartridge opening operation from prior opening operations not having such axial coaction.

The foregoing and other objects, features, and advantages of the invention will be apparent from the following more particular description of a preferred embodiment of the invention, as illustrated in the accompanying drawing.

THE DRAWING

GENERAL DESCRIPTION

Figure 3:
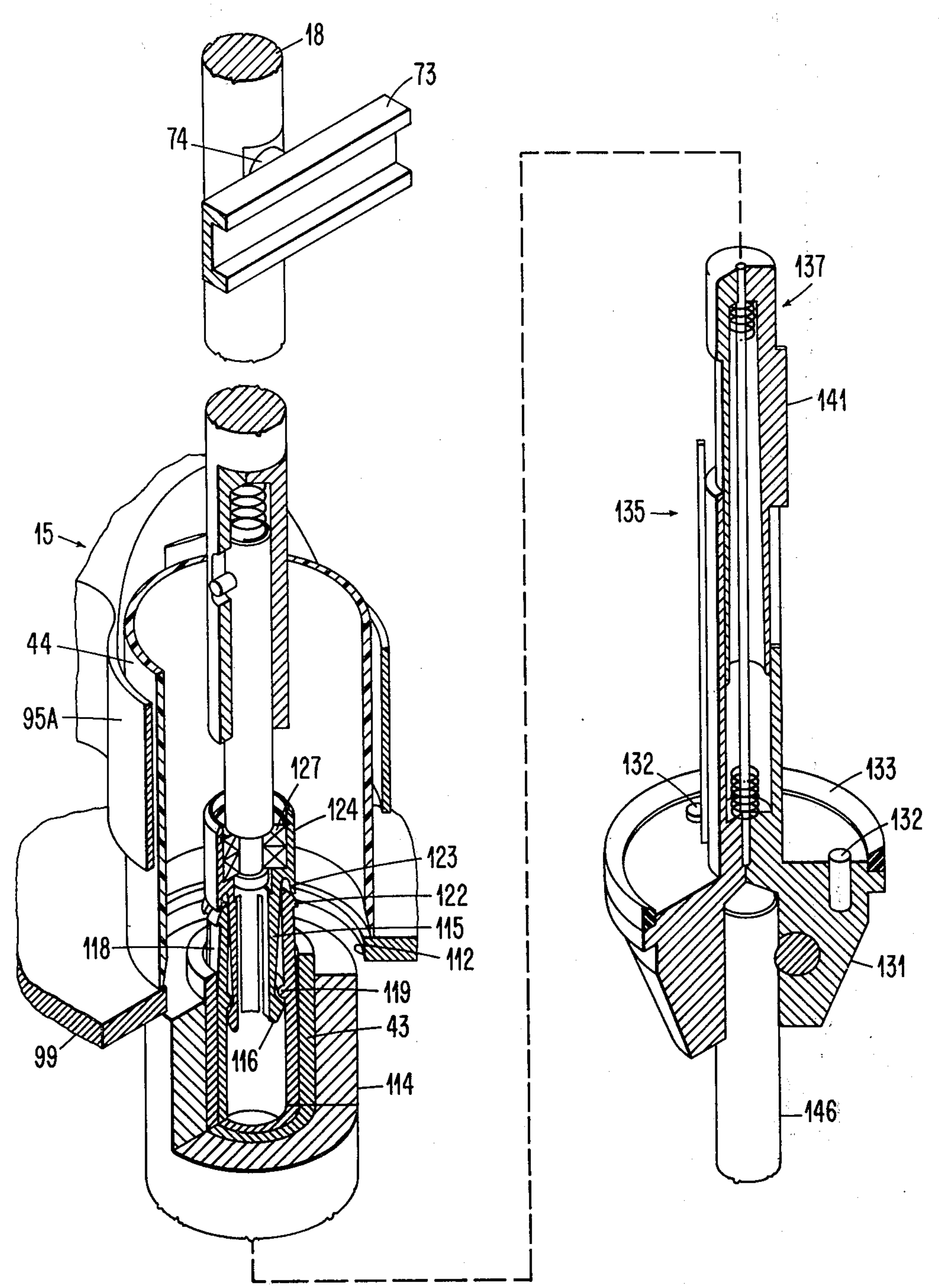
FIG. 3 is a simplified diagrammatic showing of reciprocating apparatus usable for transferring cartridges between a conveyor and a read/write station.

Referring now more particularly to the drawings, like numerals indicate like parts of structural features in the various views and diagrams. A circular cylindrical tape-containing cartridge 42 is conveyed to a work station shown in FIG. 3 by conveying apparatus disclosed in copending commonly assigned U.S. patent application Ser. No. 445,732, filed Feb. 25, 1974, supra. According to that copending application, a conveyor 15 carries the circular cylindrical tape-containing cartridge 42 to a work station, such as shown in FIG. 3, having a reciprocating idler shaft 18 with a cartridge opening end portion 124 rotably secured thereto as by bearings 127. The cartridge slides along bottom plate 99 until coaxially aligned with idler shaft 18 and driving shaft 135. Scotch yoke driver (not shown) engages scotch yoke 73, affixed to idler shaft 18 at 74, such that end portion 124 engages the free or non-flanged end of spool 43 to permit driving shaft 146 to rapidly rotate spool 43. Spool 43 may also be a double-flanged spool. Tape 114 on spool 43 feeds into a read/write or a tape recorder transducing station (not shown). At the work station, shown in FIG. 3, tubular cover 44 is retained in conveyor basket 95A by bottom plate 99. Area 112 of plate 99 circumscribes an aperture of lesser diameter than tubular cover 44. Spool 43 on end portion 124 descends through the plate 99 aperture and over upstanding driving shaft 135 to rest upon driving clutch 131.

Clutch 131 has a set of three positioning pins 132 for engaging metal plate or disk 45 on the end of the spool flange for positioning same axially with respect to shaft 135. Spool 43 hollow core receives shaft 135 as well as end portion 124 and fingers 116 of shaft 18. Shaft 135 is such that end portion 137 is axially compressed as spool 43 descends. Key 141 engages a keyway (not shown) in the flange end of spool 43. A resilient circular annular ring 133 engages serrations 134 of spool flange 113 for preventing relative rotation (FIG. 2).

Figure 2:
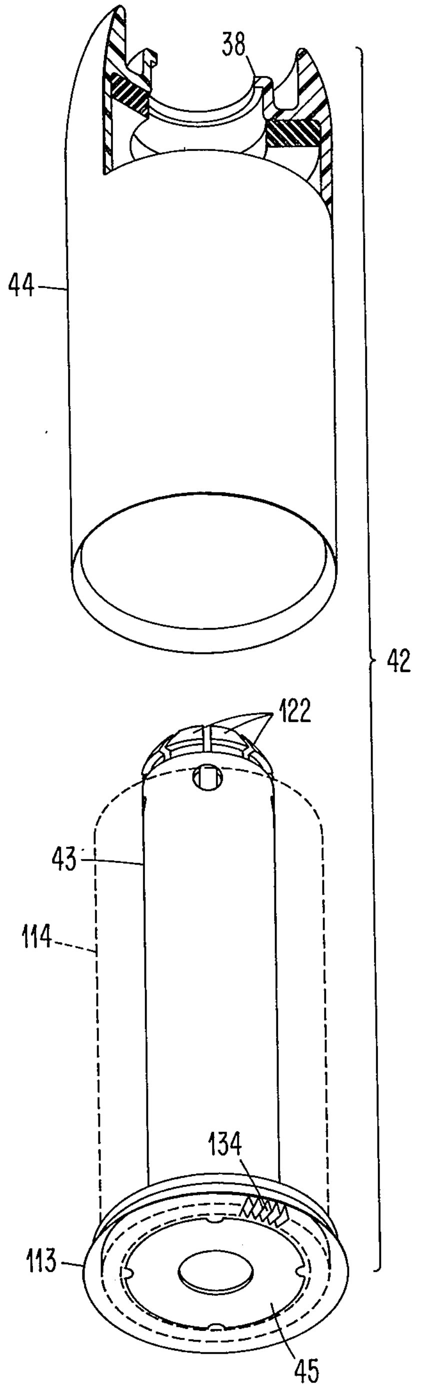
FIG. 2 is a diagrammatic showing of a tapecontaining cartridge particularly adapted to be opened and closed by the illustrated apparatus.
Figure 1:
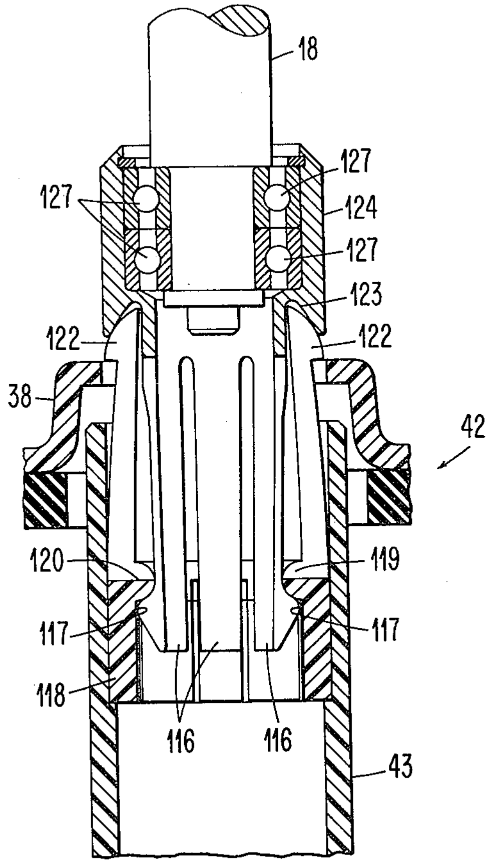
FIG. 1 is a diagrammatic view of cartridge opening and spool-holding apparatus employing the present invention in holding engagement with a tape spool.

Referring more particularly to FIGS. 1 and 2, end portion 124 has annular cam 123 for engaging the tapered ends of resilient fingers 122 to move same radially inwardly to a cover-releasing position, shown in FIG. 1. In this position, fingers 122 are free from latching ring 38, integrally formed with cover 44.

Additionally, end portion 124 has a coaxial set of circularly disposed resilient spool-holding fingers 116 which engage annular rib or ring 119 in insert 118. Fingers 116 provide radial outward urging on rib 119 for securing the spool to end portion 124 by exerting a camming force on rib 119 in an axial direction opposite to the axial camming force of annular cam 123. That is, the dimensions of end portion 124 between annular cam 123 and the large axial end portion 116 of fingers 118 are selected to be in a given precise relationship to the axial dimensions of locking fingers 118 and rib or ring 119. As end portion 124 enters the hollow core of spool 43, the axial ends of spool-holding fingers 116 slide over the radially inward annular rib 119. The arrangement is such that the spool is self-centering on the annular cam 123. Shortly after the engagement of rib 119 and fingers 116, annular cam 123 engages the axial outermost portiions of fingers 122. Before fingers 122 are completely radially inwardly urged by cam 123, the radial outwardmost portions 117 of spool-holding fingers 116 have passed the center 120 of rib 119. The resiliency of fingers 116 axially cam against rib 119 pulling annular cam 123 over the axial outermost ends of fingers 122 completely freeing tubular cover 44 from spool 43, while simulataneously securing spool 43 to end portion 124 as shown in FIG. 1. As soon as the FIG. 1 illustrated position has been reached, idler shaft 18 is reciprocated downwardly as shown in FIG. 3 removing spool 43 from inside tubular cover 44 into a work position below plate 99 wherein spool 43 is on clutch 131.

Upon completion of the transducing operations, shaft 18 is reciprocated upwardly as shown in FIG. 3 returning spool 43 with its supported tape 114 to inside tubular cover 44 to the position illustrated in FIG. 1. Shaft 18 continues to move upwardly causing spool-holding fingers 116 to again slide over radially inwardly extending rib 119. Simultaneously, annular cam 123 moves away from the locking end portions of fingers 122 allowing same to re-engage the locking edge 38 of tubular cover 44. Continued reciprocation of shaft 18 removes end portion 124 completely from the illustrated circular cylindrical tape-containing cartridge. The cartridge is then removed from the work station area as taught by Proper et al., supra.

While the invention has been particularly shown and described with reference to a preferred embodiment thereof, it will be understood by those skilled in the art that various changes in form and details may be made therein without departing from the spirit and scope of the invention.

What is claimed is:

1. A combined cover separating and spool-holding tool apparatus for operation with a circular cylindrical tape-containing cartridge having a hollow core spool covered by a tubular cover with a circular set of latching fingers on a core of said spool which radially outwardly engage an annular locking ridge on said tubular cover, said latching fingers having radially outwardly faced camming surfaces circumferentially disposed about and radially outward of a circle having a given diameter, a radially inwardly extending annular rib on said latching fingers approximately a given axial distance from said camming surfaces, the improvement including in combination:

an annular cam having a diameter enabling said cam to coact with said latching fingers and having a maximum diameter smaller than the diameter of said annular locking ridge for exerting a given axial force on said latching fingers; and a circular set of resilient axially extending fingers coaxial with said annular cam and extending axially outwardly thereof said given axial distance approximating the length of said latching fingers and each of said spool-holding fingers having a radially outwardly extending detent/cam portion for exerting an axial force on said spool in the direction opposite to and greater than an axial force simultaneously exerted by said annular cam.

2. The apparatus set forth in claim 1 further including bearing means at an axial end portion of said apparatus opposite to said spool-holding fingers for rotationally receiving a support shaft.

3. Apparatus set forth in claim 1 wherein said annular cam consists of an outer portion having an inside diameter greater than said given diameter, and a radial inward cam portion coaxial with said outer portion and coaxially aligned therewith, said outside diameter being smaller than the diameter equal to the diameter of said annular latching ridge.

4. The apparatus set forth in claim 3 wherein said radially outwardly extending detent has a forward axially extending cam and a backward axially extending cam surface, whereby as said apparatus is inserted into said spool, said backward axially acting cam aids the force of said annular cam on said latching fingers and tends to pull said annular cam over said latching fingers.

5. The method of opening a tape cartridge having a tubular axially removable cover disposed over a tape-holding spool and latched thereto at one axial end by a circular set of radially movable resilient fingers, the spool having a hollow core with a radial extending rib axially inward of said resilient fingers, the step of:

first engaging said rib with radial and axial forces, said axial forces directed toward said resilient fingers;

simultaneously engaging said fingers to urge same radially into an unlatching position while exerting an axial force thereon opposite to the first-mentioned axial forces; and then axially relatively moving said cover and spool while at least partially holding said spool by said axial forces.

* * * * *